United States Patent
Okamoto et al.

(10) Patent No.: US 6,451,439 B2
(45) Date of Patent: Sep. 17, 2002

(54) PRIMER COMPOSITION AND METHOD OF EFFECTING ADHESION FOR SEALING COMPOSITIONS

(75) Inventors: Toshihiko Okamoto; Makoto Chiba, both of Kobe; Junji Takase, Akashi, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/820,701

(22) Filed: Mar. 30, 2001

Related U.S. Application Data

(63) Continuation of application No. 09/237,347, filed on Jan. 26, 1999, now abandoned.

(30) Foreign Application Priority Data

Jan. 26, 1998 (JP) .............................................. 10-12760

(51) Int. Cl.⁷ .......................... B32B 9/04; C08G 77/18; C08G 77/16
(52) U.S. Cl. .......................... 428/447; 528/17; 528/18; 528/34; 528/35; 156/329; 156/334; 106/287.11; 106/287.12; 106/287.16
(58) Field of Search .............................. 528/17, 18, 34, 528/35; 106/287.11, 287.16, 287.12; 428/447; 156/329, 334

(56) References Cited

U.S. PATENT DOCUMENTS

| | | | |
|---|---|---|---|
| 4,349,603 A | | 9/1982 | Kameyama et al. ........ 428/334 |
| 4,808,664 A | * | 2/1989 | Saam ........................ 525/106 |
| 4,904,732 A | * | 2/1990 | Iwahara et al. ............. 525/100 |
| 5,223,575 A | * | 6/1993 | Mori et al. ................. 525/102 |
| 6,020,446 A | * | 2/2000 | Okamoto et al. ........... 526/279 |

FOREIGN PATENT DOCUMENTS

| | | |
|---|---|---|
| EP | 0 252 372 A1 | 1/1988 |
| EP | 0 255 170 A1 | 2/1988 |
| EP | 0 287 025 | 10/1988 |
| EP | 0 312 967 A1 | 4/1989 |
| EP | 0 758 029 A2 | 2/1997 |
| EP | 0 839 872 A2 | 5/1998 |
| EP | 0 934 956 A1 | 8/1999 |
| EP | 0 934 984 A1 | 8/1999 |
| WO | 97/31032 * | 8/1997 |

* cited by examiner

*Primary Examiner*—Margaret G. Moore
(74) *Attorney, Agent, or Firm*—Connolly Bove Lodge & Hutz LLP

(57) ABSTRACT

A primer composition showing good adhesion to the surface of a substrate, such as a glass substrate, and excellent in weather resistance and water resistance as well as a method of effecting adhesion is provided. The primer composition is characterized by comprising a saturated hydrocarbon polymer having at least one silicon-containing group which has hydroxyl or hydrolyzable group bound to the silicon atom and capable of crosslinking under formation of a siloxane bond.

28 Claims, No Drawings

PRIMER COMPOSITION AND METHOD OF EFFECTING ADHESION FOR SEALING COMPOSITIONS

RELATED APPLICATIONS

The present application is a continuation of U.S. patent application Ser. No. 09/237,347, filed Jan. 26, 1999, now abandoned.

FIELD OF THE INVENTION

The present invention relates to a primer composition comprising a saturated hydrocarbon polymer having at least one silicon-containing group which has hydroxyl group or hydrolyzable group bound to the silicon atom and is capable of crosslinking under formation of a siloxane bond (hereinafter referred to as "reactive silicon group") and to a method of effecting adhesion for sealing compositions using the same.

PRIOR ART

In recent years, elastic sealing compositions have been used widely in buildings, motor vehicles and so on. Sealing compositions are materials used for the purpose of filling up junctions or gaps between various parts and providing airtightness and watertightness. Therefore, they are required to show good adhesive properties for various substrates constituting joints, window frames and the like, namely inorganic materials such as glass, ceramics, metals, cement, mortar, etc., or organic materials such as plastics (hereinafter collectively referred to as "substrates"). However, the adhesive properties of sealing compositions are still unsatisfactory and, therefore, the use of primers is essential in many cases.

On the other hand, silicone-based, modified silicone-based, polysulfide-based and polyurethane-based sealing compositions are well known as compositions to be applied to joints of the interior and exterior of general buildings. These sealing compositions are used properly based on the policy of "the right thing in the right place". Namely, suitable sealing compositions are selected according to the joints (inclusive of substrate species) to be sealed. Thus, exclusive-use primers adapted to respective sealing compositions have been developed.

As regards primers for sealing compositions for buildings, urethane-based primers containing an isocyanate prepolymer as a main component, and silane type primers constituted of a low-molecular-weight silane compound such as a silane coupling agent, or an organopolysiloxane, among others, are commercially available. However, it is a problem that even when these primers are used, the weather resistance and water resistance of the adhesion are not satisfactory and the effects of the primers cannot be produced over a prolonged period of time.

On the other hand, sealing compositions containing, as the main component thereof, a saturated hydrocarbon polymer containing a reactive silicon group (in particular isobutylene-based sealing compositions with an isobutylene-based polymer as the main chain skeleton) have recently been developed. These isobutylene-based sealing compositions are characterized in that they are excellent in dynamic follow properties, heat resistance, weather resistance, water resistance and coatability and do not contaminate joint surroundings. Their performance characteristics are thus suited for their use as universal sealing compositions. However, no exclusive-use primers for isobutylene-based sealing compositions have ever been developed.

SUMMARY OF THE INVENTION

The present invention has its object to provide a primer composition excellent in adhesion properties to various substrates, in particular a primer composition for effecting good adhesion, to various substrates, of sealing compositions containing, as a Main component, a saturated hydrocarbon polymer having at least one reactive silicon group, as well as a method of effecting adhesion.

The present inventors made intensive investigations in an attempt to solve such problems and, as a result, found that the above object can be accomplished by providing a primer composition containing a saturated hydrocarbon polymer having at least one reactive silicon group. The present invention has now been completed based on such findings.

The present invention thus relates to a primer composition which comprises (A) a saturated hydrocarbon polymer having at least one silicon-containing group which has hydroxyl group or hydrolyzable group bound to the silicon atom and is capable of crosslinking under formation of a siloxane bond, in particular to a primer composition which comprises 0.1 to 10,000 parts by weight of (B) a silane coupling agent per 100 parts by weight of the (A) saturated hydrocarbon polymer having at least one silicon-containing group which has hydroxyl group or hydrolyzable group bound to the silicon atom and is capable of crosslinking under formation of a siloxane bond.

DETAILED DESCRIPTION OF THE INVENTION

The present invention is now described in detail.

The saturated hydrocarbon polymer having at least one reactive silicon group, namely component (A), to be used in the present invention is a component characterizing the present invention. It shows good adhesion to various substrates such as glass and metals and functions as a component forming films excellent in resistance to weather through glass and in water resistance. Thus, it is a component providing the primer composition of the present specification with strong adhesion and durability.

This saturated hydrocarbon polymer having at least one reactive silicon group, namely component (A), is a polymer substantially free of carbon-carbon unsaturated bonds other than aromatic ring bonds. As such, there may be mentioned, for example, polyethylene, polypropylene, polyisobutylene, hydrogenated polybutadiene and hydrogenated polyisoprene.

The reactive silicon group is typically a group represented by the general formula (1)

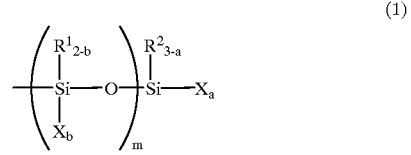

wherein $R^1$ and $R^2$ each independently is a hydrogen atom, an alkyl group containing 1 to 20 carbon atoms, an aryl group containing 6 to 20 carbon atoms, an aralkyl group containing 7 to 20 carbon atoms or a triorganosiloxy group of the formula $(R')_3SiO$— (in which each $R'$ independently represents a hydrogen atom or a substituted or unsubstituted hydrocarbon group containing 1 to 20 carbon atoms), each X independently represents a hydroxyl group or a hydrolyzable group, a is 0, 1, 2 or 3, b is 0, 1 or 2, to the exclusion of the case where a and b are simultaneously 0 (zero), and m is 0 (zero) or an integer of 1 to 19.

As the hydrolyzable group, there may be mentioned, for example, a hydrogen atom and groups commonly used for the same purposes, such as alkoxy, acyloxy, ketoxime, amino, amido, aminoxy, mercapto and alkenyloxy groups.

Among these, alkoxy, amido, aminoxy groups are preferred and alkoxy groups are most preferred because of their mild hydrolyzability and ease of handling.

One to three hydrolyzable or hydroxyl groups can be bound to one silicon atom and the sum (a+Σb) is preferably within the range of 1 to 5. When two or more hydrolyzable or hydroxyl groups are bound in the reactive silicon group, they may be the same or different.

The number of silicon atoms constituting the reactive silicon group is one or more. When silicon atoms are connected via siloxane bonding, the number thereof is preferably not more than 20.

In particular, reactive silicon groups represented by the general formula (2)

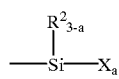

(2)

wherein $R^2$, X and a are as defined above, are readily available, hence preferred.

The number of reactive silicon groups per molecule of the (A) saturated hydrocarbon polymer is not less than 1, preferably 1.1 to 5. When the number of reactive silicon groups per molecule is below 1, the curability will be insufficient and thereby good coats may not be obtained in some instances.

The reactive silicon group or groups may occur at one or both ends of and/or within the molecular chain of the saturated hydrocarbon polymer. In particular, when the reactive silicon group or groups occur at one or both ends of the molecular chain, the amount of those effective network chains of the saturated hydrocarbon polymer component contained in the finally formed cured coats increases, therefore those are preferred owing to making it easy to obtain high-strength coats.

These saturated hydrocarbon polymers having at least one reactive silicon group, namely component (A), may be used either singly or in combination.

The polymer constituting the (A) saturated hydrocarbon polymer having at least one reactive silicon group to be used in the present invention can be obtained by (1) polymerizing an olefinic compound containing 1 to 6 carbon atoms, such as ethylene, propylene, 1-butene or isobutylene, as a main monomer, or (2) homopolymerizing a diene compound, such as butadiene or isoprene, or copolymerizing such diene compound with such an olefinic compound as mentioned above, and then hydrogenating the resulting polymer or copolymer. Isobutylene polymers and hydrogenated polybutadiene polymers are preferred, however, since functional group introduction thereinto at one or both ends of the molecular chain can be easily realized, their molecular weights can be easily controlled, and the number of terminal functional groups can be increased.

As regards the isobutylene polymers, the monomer units thereof may be composed of isobutylene units alone, or may contain monomer units copolymerizable with isobutylene preferably in an amount not more than 50% (% by weight; hereinafter the same shall apply), more preferably not more than 30%, most preferably not more than 10% of the isobutylene polymers.

As such monomer constituent, there may be mentioned olefins containing 4 to 12 carbon atoms, vinyl ethers, aromatic vinyl compounds, vinylsilanes, allylsilanes and the like. As such copolymer constituents, there may be mentioned, for example, 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane and the like.

When a vinylsilane or an allylsilane is used as the monomer copolymerizable with isobutylene, a silicon content, hence an increased amount of groups capable of acting as silane coupling agents is increased, with the result that the adhesion properties of the resulting primer composition is improved.

Like the case of the above-mentioned isobutylene polymers, the hydrogenated polybutadiene polymers and other saturated hydrocarbon polymers may contain other monomer units in addition to the main component monomer units.

The (A) saturated hydrocarbon polymer having at least one reactive silicon group to be used in the present invention may contain a small proportion, preferably not more than 10%, more preferably not more than 5%, most preferably not more than 1%, of monomer units, for example a polyene compound such as butadiene or isoprene, leaving a double bond after polymerization up to the limit allowing accomplishment of the objects of the present invention.

The (A) saturated hydrocarbon polymer having at least one reactive silicon group, preferably an isobutylene polymer or hydrogenated polybutadiene polymer preferably has a number average molecular weight of about 500 to 50,000. In particular, those liquid or flowable ones which have a molecular weight of about 1,000 to 20,000 are preferred from the ease-of-handle viewpoint, among others.

Hereinafter, the methods of preparing the (A) saturated hydrocarbon polymer having at least one reactive silicon group are described using isobutylene polymer having at least one reactive silicon group as an example.

Among isobutylene polymers having at least one reactive silicon group, those isobutylene polymers having a reactive silicon group at one or both ends of the molecular chain can be prepared by using a terminal function type isobutylene polymer, preferably one having functional groups at both ends, obtained by the polymerization method called inifer method (cationic polymerization method using a specific compound called inifer which serves as an initiator and also as a chain transfer agent). Thus, for example, a polyisobutylene having a terminal unsaturated group or groups is obtained by the hydrogen halide elimination reaction of said polymer or by the reaction for introducing an unsaturated group into a polymer as described in Japanese Kokai Publication Sho-63-105005 and, then, the terminally unsaturated polyisobutylene is subjected to the addition reaction called hydrosilylation using a hydrosilane compound represented by the general formula

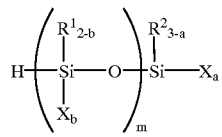

wherein $R^1$, $R^2$, X, a, b and m are as defined above (this compound is a compound resulting from binding of a hydrogen atom to a group of general formula (1)), preferably a hydrosilane compound represented by the general formula

wherein $R^2$, X and a are as defined above, in the presence of a platinum catalyst to thereby introduce the reactive silicon group into the polymer. The hydrosilane compound includes, but is not limited to, halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacatoxysilane and phenyldiacetoxysilane: ketoximatosilanes such as bis(dimethylketoximato)methylsilane and bis(cyclohexylketoximato)methylsilane, for instance. Among these, halogenated silanes and alkoxysilanes are preferred.

Such production methods are described, for example in Japanese Kokoku Publication Hei-04-69659, Japanese Kokoku Publication Hei-07-108928, Japanese Patent No. 2512468, Japanese Kokai Publication Sho-64-22904, Japanese Patent No. 2539445 and elsewhere.

Isobutylene polymers having a reactive silicon group or groups within the molecular chain are prepared by adding a vinylsilane or allylsilane each having the reactive silicon group to a monomer composition mainly containing isobutylene and copolymerizing said composition.

Further, isobutylene polymers having reactive silicon groups at one or both ends of the molecular chain and within the molecular chain are produced by copolymerizing, on the occasion of the polymerization for preparing isobutylene polymers having a reactive silicon group or groups at one or both ends of the molecular chain, vinylsilane or allylsilane each having a reactive silicon group in addition to the main component isobutylene monomer and then introducing a reactive silicon group into the resulting polymers at one or both ends of the molecular chain.

As the vinylsilane or allylsilane each having the reactive silicon group, there may be mentioned, for example, vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, γ-methacryloyloxypropylmethyldimethoxysilane and the like.

As regards the hydrogenated polybutadiene polymers mentioned above, a hydrogenated polybutadiene polymer having a terminal olefinic group (hereinafter, olefin-terminated hydrogenated polybutadiene polymer) is prepared, for example, by first converting the hydroxyl group or groups of a hydroxyl-terminated hydrogenated polybutadiene polymer to oxymetal groups such as —ONa or —OK and then reacting the same with an organohalogen compound represented by the general formula (3)

$$CH_2=CH-R^3-Y \qquad (3)$$

wherein Y is a halogen atom, such as a chlorine or iodine atom and $R^3$ is a divalent organic group of the formula —$R^4$—, —$R^4$—OCO or —$R^4$—CO— (in which $R^4$ is a divalent hydrocarbon group containing 1 to 20 carbon atoms, preferably an alkylene, cycloalkylene, arylene or aralkylene group) and most preferably is a divalent group selected from among —$CH_2$— and —R"—$C_6H_5$—$CH_2$— (in which R" is a hydrocarbon group containing 1 to 10 carbon atoms).

As the method of converting the terminal hydroxyl group of the hydroxyl-terminated hydrogenated polybutadiene polymer to an oxymetal group, there may be mentioned the method comprising reacting the terminal hydroxyl group with an alkali metal such as Na or K, a metal hydride such as NaH, a metal alkoxide such as $NaOCH_3$, an alkali hydroxide such as NaOH or KOH, or the like.

The above-mentioned methods give olefin-terminated hydrogenated polybutadiene polymer having approximately the same molecular weight as that of the hydroxyl-terminated hydrogenated polybutadiene polymer used as the starting material. When polymers having a higher molecular weight are desired, the molecular weight can be increased by reacting with a polyvalent organohalogen compound containing two or more halogen atoms per molecule, for example methylene chloride, bis(chloromethyl)benzene or bis(chloromethyl)ether, prior to the reaction with the organohalogen compound of general formula (3). Hydrogenated polybutadiene polymers having a higher molecular weight and a terminal olefinic group can be obtained by the subsequent reaction with the organohalogen compound of general formula (3).

The above-mentioned organohalogen compound represented by the general formula (3) includes as typical examples thereof, but is not limited to, allyl chloride, allyl bromide, vinyl(chloromethyl)benzene, allyl(chloromethyl) benzene, allyl(bromomethyl)benzene, allyl(chloromethyl) ether, allyl(chloromethoxy)benzene, 1-butenyl (chloromethyl)ether, 1-hexenyl(chloromethoxy)benzene, allyloxy(chloromethyl)-benzene and the like. Among these, allyl chloride is inexpensive and reacts readily, hence is preferred.

The introduction of the reactive silicon group into the above-mentioned olefin-terminated hydrogenated polybutadiene polymer is realized by the addition reaction of a hydrosilane compound using a platinum catalyst, like the case of the isobutylene polymers having a reactive silicon group or groups at one or both ends of the molecular chain.

When the saturated hydrocarbon polymers having at least one reactive silicon group are substantially free of intramolecular unsaturated bonds other than aromatic ring bonds, as mentioned above, the coats formed therefrom can have markedly improved weather resistance as compared with the coats formed from the conventional rubber-like polymers such as unsaturated bond-containing organic polymers or oxyalkylene polymers. Since said polymers are hydrocarbon polymers, they show good moisture shield effects and good water resistance. They form coats which show excellent adhesion properties for various inorganic materials such as glass and aluminum, and have high moisture shielding effects.

The content of the (A) saturated hydrocarbon polymer having at least one reactive silicon group in the primer composition of the present invention is preferably not less than 1%, more preferably not less than 3%, most preferably not less than 5%. In particular, when the primer composition of the present invention is applied to a porous substrate such as mortar, the coats are required to have an increased thickness so that water can be prevented from oozing from the porous material and, therefore, the content of said polymer is preferably not less than 5%, more preferably not less than 10%, most preferably not less than 20%.

The (A) saturated hydrocarbon polymer having at least one reactive silicon group mentioned above is in itself high in viscosity and poor in workability. Therefore, for the purpose of lowering the viscosity of said polymer and improving the handling behavior thereof, various plasticizers may be added in proportions not impairing the adhesion properties or eco-friendly aspect of the primer composition of the present invention.

As plasticizers compatible with the saturated hydrocarbon polymer having at least one reactive silicon group, namely component (A) of the present invention, there may be mentioned polyvinyl oligomers such as polybutene, hydrogenated polybutene, hydrogenated α-olefin oligomers, atactic poly-propylene etc.; aromatic oligomers such as biphenyl, triphenyl, etc.; hydrogenated polyene oligomers such as hydrogenated liquid polybutadiene; paraffin oligomers such as paraffin oil, chlorinated paraffin oil, etc. cycloparaffin oligomers such as naphthene oil etc.; and the like.

Phthalate ester plasticizers, nonaromatic dibasic acid ester plasticizers, phosphate ester plasticizers and the like may also be used in combination with the plasticizers mentioned above, in proportions not lowering the adhesion properties, weather resistance and heat resistance of the primer composition of the present invention. These may be used either singly or in combination.

The plasticizers mentioned above may also be used in lieu of a solvent for adjusting the reaction temperature and the viscosity of the reaction system on the occasion of reactive silicon group introduction into the saturated hydrocarbon polymer.

The addition amount of the above-mentioned plasticizers is preferably 1 to 100 parts (parts by weight; hereinafter the same shall apply), more preferably 10 to 50 parts, per 100 parts of the (A) saturated hydrocarbon group having at least one reactive silicon group. When the addition amount of the plasticizers is lower than said range, the plasticizing effect will be low. At addition amounts higher than said range, sufficient adhesion properties may not be obtained in certain instances.

The silane coupling agent, namely component (B) in the present invention, forms firm coats by reacting with the saturated hydrocarbon polymer having at least one reactive silicon group, namely component (A), and improves the adhesion strength of various sealing compositions such as isobutylene-based sealing compositions or modified silicone-based sealing compositions to various substrates such as glass, metals and mortar. The (B) silane coupling agent is a compound having a silicon atom to which a hydrolyzable group or groups are bound (hereinafter referred to as hydrolyzable silicon group) and having other functional group. As examples of this hydrolyzable silicon group, there may be mentioned those groups in which X is a hydrolyzable group among groups represented by the general formula (1). Specifically, those groups already mentioned hereinabove as hydrolyzable groups may be mentioned here again. From the hydrolysis rate viewpoint, methoxy, ethoxy and the like are preferred. The number of hydrolyzable groups is preferably 2 or more, most preferably 3 or more.

As examples of the functional group other than the hydrolyzable silicon group, there may be mentioned primary, secondary or tertiary amino, mercapto, epoxy, carboxyl, vinyl, isocyanato and isocyanurate groups, halogens and the like. Among these, primary, secondary or tertiary amino, epoxy, isocyanato, isocyanurate and like groups are preferred, and isocyanato and amino groups are most preferred.

As specific examples of the (B) silane coupling agent, there may be mentioned amino-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-(2-aminoethyl) aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis (2-methoxyethoxy)silane and N-β-(carboxymethyl) aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; isocyanurate silanes such as tris(trimethoxysilyl) isocyanurate; isocyanato-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane; and the like. Derivatives which are modifications of these, such as amino-modified silyl polymers, silylated amino polymers, unsaturated aminosilane complexes, blocked isocyanato-containing silanes, phenylamino long-chain alkylsilanes, aminosilylated silicones and silylated polyesters may also be used as silane coupling agents.

In the present invention, the (B) silane coupling agent is used in an amount of 0.1 to 10,000 parts per 100 parts of the (A) saturated hydrocarbon group having at least one reactive silicon group. In particular, the use thereof in an amount of 1 to 100 parts is preferred. The (B) silane coupling agents mentioned above may be used singly or two or more kinds of them may be used in admixture.

Another tackifier other than the (B) silane coupling agent may be used in the primer composition of the present invention.

The organic titanate ester, namely component (C) in the present invention, is a component for improving the adhesion strength of various sealing compositions, such as isobutylene-based sealing compositions or modified silicone-based sealing compositions, to various substrates, such as glass, metals and mortar. Also, it has another function, namely it improves the adhesive properties at construction joints on the occasion of placing a sealing composition in contact with a cured sealing composition. In particular, it functions so as to improve the adhesion properties at construction joints on the occasion of placing a sealing composition other than a silicone-based sealing composition in contact with a silicone-based sealing composition (earlier placed sealing composition). Further, the (C) organic titanate ester is a component also functioning as a silanol condensation catalyst, promoting the condensation reaction of the reactive silicon groups of the (A) saturated hydrocarbon polymer having at least one reactive silicon group and of the (B) silane coupling agent.

As such organic titanate ester (C), there may be mentioned organic titanate esters, titanium chelate compounds, chelate compounds of titanium with a silicic acid ester, titanate coupling agents, and partial hydrolyzate condensates of these. As specific examples of the organic titanate ester, there may be mentioned tetraisopropyl titanate, tetranormal-butyl titanate, butyl titanate dimer, tetrakis(2-ethylhexyl) titanate, tetrastearyl titanate, tetramethyl titanate, diethoxybis(acetylacetonato)titanium, diisopropylbis (acetylacetonato )titanium, diisopropoxybis(ethyl acetoacetato)titanium, isopropoxy(2-ethyl-1,3-hexanediolato)titanium, di(2-ethylhexoxy)bis(2-ethyl-1,3-hexanediolato)titanium, di-n-butoxybis-(triethanolaminato) titanium, tetraacetylacetonatotitanium, hydroxybis(lactato) titanium, and hydrolyzate condensates of these. As specific examples of the (C) titanate coupling agent, there may be mentioned compounds represented by the formula

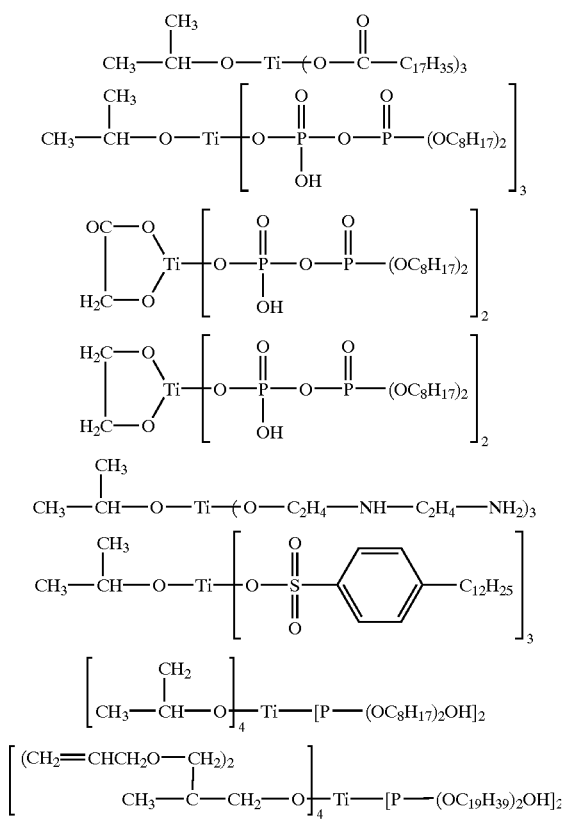

and hydrolyzate condensates of these.

In the present invention, the (C) organic titanate ester is used in an amount of 0.1 to 10,000 parts per 100 parts of the (A) saturated hydrocarbon group having at least one reactive silicon group. In particular, the use thereof in an amount of 1 to 100 parts is preferred. The (C) organic titanate esters mentioned above may be used singly or two or more kinds of them may be used in admixture.

In the primer composition of the present invention, a silanol condensation catalyst may be used as a component (D) functioning to cure the primer composition of the present invention and provide the same with air-drying properties.

As such silanol condensation catalyst (D), there may be mentioned divalent and tetravalent tin-based curing catalysts, aluminum-based curing catalysts, amine-based curing catalysts and the like. Among these, tetravalent tin-based curing catalysts are preferred because of their high catalytic activity. As specific examples of the tetravalent tin-based curing catalysts, there may be mentioned tin carboxylate salts, dialkyltin oxides and compounds represented by the general formula (4)

$$Q_d Sn(OZ)_{4-d} \text{ or } [Q_2 Sn(OZ)]_2 O \qquad (4)$$

wherein Q represents a monovalent hydrocarbon group containing 1 to 20 carbon atoms, Z represents a monovalent hydrocarbon group containing 1 to 20 carbon atoms or a functional group capable of forming within itself a coordination bond to Sn, and d is 0, 1, 2 or 3. Reaction products from a tetravalent tin compound such as a dialkyltin oxide, dialkyltin diacetate or the like and a low-molecular-weight silicon compound having one or more hydrolyzable silicon groups, such as tetraethoxysilane, methyltriethoxysilane, diphenyldimethoxysilane or phenyltrimethoxysilane are also useful as curing catalysts markedly accelerating the silanol condensation reaction. Among these, compounds of general formula (4), namely dibutyltin bisacetylacetonate or like chelate compounds or tin alcoholates, are highly active as silanol condensation catalysts and accelerate the film forming reaction rate of the primer composition, hence are more preferred.

As specific examples of the above-mentioned tin carboxylate salts, there may be mentioned dibutyltin dilaurate, dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dioctyltin diacetate, dioctyltin distearate, dioctyltin dilaurate, dioctyltin diethylmaleate and dioctyltin diisooctylmaleate.

As specific examples of the above-mentioned dialkyltin oxides, there may be mentioned dibutyltin oxide, dioctyltin oxide, and mixtures of dibutyltin oxide and a phthalate ester.

Specific examples of the above-mentioned chelate compounds include, but are not limited to,

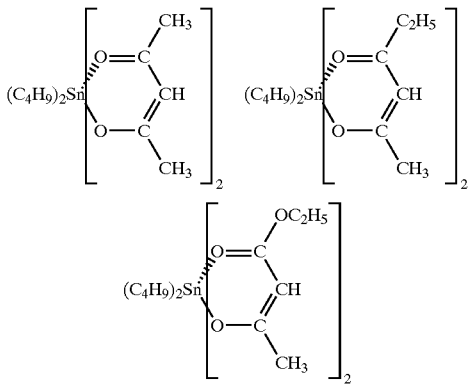

and the like. Among these, dibutyltin bisacetylacetonate shows a high catalytic activity, is low in cost and is readily available, hence is most preferred.

Specific examples of the above-mentioned tin alcoholates include, but are not limited to,

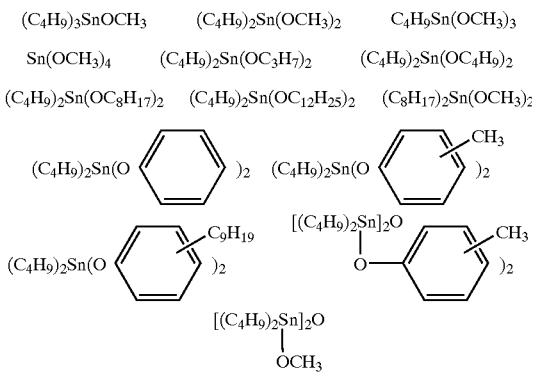

and the like. Among these, dialkyltin dialkoxides are preferred. In particular, dibutyltin dimethoxide is low in cost and is readily available, hence is more preferred.

The (D) silanol condensation catalyst other than the tetravalent tin-based curing catalysts mentioned silanol condensation catalysts such as above may also be used. As specific examples, there may be mentioned bivalent tin-based curing catalysts such as stannous octoate; aluminum-based curing catalysts such as aluminum trisacetylacetonate, aluminum tris (ethyl-acetoacetate) and diisopropoxyaluminum ethyl -acetoacetate; zirconium tetraacetylacetonate; lead octoate; amine-based curing catalysts such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo(5.4.0)undecene-7 (DBU) or salts of these amine compounds with carboxylic acids; low-molecular-weight polyamide resins obtained from an excess polyamine and a polybasic acid; reaction products from an excess polyamine and an epoxy compound; amino-containing silane coupling agents such as γ-aminopropyltrimethoxysilane and N-(β-aminoethyl) aminopropylmethyldimethoxysilane; and, further, other known silanol condensation catalysts such as acidic catalysts and basic catalysts.

These catalysts may be used singly or two or more kinds of them may be used in combination.

The addition amount of this silanol condensation catalyst, namely component (D), is incorporated preferably about 0.1 to 100 parts, more preferably 1 to 20 parts, per 100 parts of the (A) saturated hydrocarbon group having at least one reactive silicon group. When the addition amount of the silanol curing catalyst is below this range, the rate of film formation may become slow and the film formation becomes difficult to achieve in certain instances. Conversely when the addition amount of the (D) silanol curing catalyst exceeds said range, the open time will become too short, which is unfavorable from the workability viewpoint.

In the present invention, a solvent may be used to adjust the primer composition to a viscosity suited for primer application. The solvent may be any one and is not limited to any particular species provided that it can dissolve the components (A) to (D) of the present invention. As specific examples of such solvent, there may be mentioned hydrocarbon solvents such as toluene, xylene, heptane, hexane and petroleum solvents, halogenated solvents such as trichloroethylene, ester solvents such as ethyl acetate and butyl acetate, ketone solvents such as acetone, methyl ethyl ketone and methyl isobutyl ketone, alcohol solvents such as methanol, ethanol and isopropanol, and silicone solvents such as hexamethylcyclotrisiloxane, octamethylcyclotetrasiloxane and decamethylcyclopentasiloxane. These solvents may be used singly or two or more kinds of them may be used in combination.

The solvent is used preferably in an amount of about 100 to 10,000 parts, more preferably 200 to 2,000 parts, per 100 parts of the (A) saturated hydrocarbon group having at least one reactive silicon group. When the amount of the solvent is below said range, the viscosity of the primer composition will become excessively high, which is unfavorable from the workability viewpoint. When the amount of the solvent exceeds said range, no sufficient adhesion is obtained in some instances.

In the primer composition of the present invention, various antioxidants may be used as necessary. As such antioxidants, there may be mentioned phenolic antioxidants, aromatic amine antioxidants, sulfur-containing hydroperoxide decomposers, phosphorus -containing hydroperoxide decomposers, benzotriazole ultraviolet absorbers, salicylate ultraviolet absorbers, benzophenone ultraviolet absorbers, hindered amine light stabilizers, nickel-containing light stabilizers and the like.

Said phenolic antioxidants include, as specific examples thereof, 2,6-di-t-butylphenol, 2,4-di-t-butylphenol, 2,6-di-t-butyl-4-methylphenol, 2,5-di-t-butylhydroquinone, n-octadecyl-3-(3,5-di-t-butyl-4-hydroxyphenyl)propionate, pentaerythrityl tetrakis[3-(3,5-di-t-butyl-4-hydroxyphenyl) propionate], 2,2'-methylenebis(4-methyl-6-t-butylphenol), 4,4'-butylidenebis(3-methyl-6-t-butylphenol) and 4,4'-thiobis(3-methyl-6-t-butylphenol).

Said aromatic amine antioxidants include, as specific examples thereof, N,N'-diphenyl-p-phenylenediamine and 6 -ethoxy-2,2,4-trimethyl-1,2-dihydroquinoline.

Said sulfur-containing hydroperoxide decomposers include, as specific examples thereof, dilauryl 3,3'-thiodipropionate, ditridecyl-3,3'-thiodipropionate and distearyl-3,3'-thiodipropionate.

Said phosphorus-containing hydroperoxide decomposers include, as specific examples thereof, diphenylisooctyl phosphate and triphenylphosphite.

Said benzotriazole ultraviolet absorbers include, as specific examples thereof, 2-(3,5-di-t-butyl-2-hydroxyphenyl)-5-chlorobenzotriazole, 2-(3-t-butyl-5-methyl-2-hydroxyphenyl)-5-chlorobenzotriazole, 2-(3,5-di-t-butyl-2-hydroxyphenyl)benzotriazole and 2-(5-methyl-2-hydroxyphenyl)benzotriazole.

Said salicylate ultraviolet absorbers include, as specific examples thereof, 4-t-butylphenyl salicylate and 2,4-di-t-butylphenyl-3,5'-di-t-butyl-4'-hydroxybenzoate.

Said benzophenone ultraviolet absorbers include, as specific examples thereof, 2,4-dihydroxybenzophenone, 2-hydroxy-4-methoxybenzophenone, 2-hydroxy-4-n-octoxybenzophenone, 2-hydroxy-4-n-dodecyloxybenzophenone and 2-hydroxy-4-benzyloxybenzophenone.

Said hindered amine light stabilizers include, as specific examples thereof, bis(2,2,6,6-tetramethyl-4-piperidyl) sebacate, bis(1,2,2,6,6-pentamethyl-4-piperidyl) sebacate, 1-{2-[3-(3,5-di-t-butyl-4-hydroxyphenyl)propionyloxy]ethyl}-4-[3-(3,5-di-t-butyl-4-hydroxyphenyl) propionyloxy]-2,2,6,6-tetramethylpiperidine and 4-benzoyloxy-2,2,6,6-tetramethylpiperidine.

Said nickel-containing light stabilizers include, as specific examples thereof, nickel dibutyldithiocarbamate, [2,2'-thiobis(4-t-octylphenolato)]-2-ethylhexylamine nickel (II) and [2,2'-thiobis(4-t-octylphenolato)]-n-butylamine nickel (II).

These antioxidants may be used singly or two or more kinds of them may be used in combination. As compared with single use, combined use may result in more effective functioning. In particular, the combined use of a phenolic antioxidant, a salicylate ultraviolet absorber and a hindered amine light stabilizer is preferred since the weather resistance of the saturated hydrocarbon polymer having at least one reactive silicon group, namely component (A) is markedly improved by said combined use.

The addition amount of the antioxidants is preferably about 0.1 to 20 parts, more preferably 1 to 10 parts, per 100 parts of component (A). At an addition amount below 0.1 part, the weather resistance cannot be improved sufficiently in some cases whereas, at an addition amount exceeding 20 parts, the cost and adhesion properties of the primer composition will be sacrificed.

Furthermore, weather-resistant property improving agent (compounds having an intramolecular unsaturated group capable of polymerizing upon reaction with oxygen in the air or photopolymerizable substances) may be added, as necessary, to the primer composition of the present invention to further improve the weather-resistant adheasion properties. These can be used singly effectively or may be used in combination.

Said compounds having an intramolecular unsaturated group capable of polymerizing upon reaction with oxygen in the air are, in other words, substances capable of undergoing the oxidative polymerization reaction. Specific examples of the substances capable of undergoing the oxidative polymerization reaction are ester compounds derived from an unsaturated higher fatty acid and an alcohol, diene type polymers or copolymers such as 1,2-polybutadione, 1,4-polybutadiene, and $C_5$–$C_8$ diene, various modifications of said polymers or copolymers (maleinated modifications, boiled oil modifications, etc.) and the like.

As specific examples of said unsaturated higher fatty acid ester compounds, there may be mentioned ester compounds obtained by the condensation reaction between a higher unsaturated fatty acid such as oleic acid, linolic acid, linolenic acid, eleostearic acid, licanic acid, ricinolic acid or arachidonic acid and an alcohol selected from among monohydric alcohols such as methanol and ethanol, dihydric alcohols such as ethylene glycol and propylene glycol, trihydric alcohols such as trimethylolpropane and glycerol, tetrahydric alcohols such as pentaerythritol, hexahydric alcohols such as sorbitol, organosilicon compounds having a hydroxyl group via an organic group bound to the silicon atom, and the like.

Among these ester compounds, drying oils mainly composed of triglycerides, which are glycerol esters of unsaturated higher fatty acids, for example linseed oil, tung oil, soybean oil, hempseed oil, isano oil, lacquer tree kernel oil, perilla oil, oiticica oil, kaya oil, walnut oil, poppy seed oil, cherry seed oil, pomegranate seed oil, safflower oil, tobacco seed oil, Chinese sumac kernel oil, rubber seed oil, sunflower seed oil, grape kernel oil, balsam seed oil and honewort seed oil, are preferred because of their unexpensiveness and ready availability.

Among said drying oils, those drying oils containing, as main components thereof, triglyceride esters of conjugated unsaturated higher fatty acids such as eleostearic acid, licanic acid, punicic acid, catalpic acid and the like, namely tung oil, oiticica oil, pomegranate seed oil and balsam seed oil and the like are more preferred because of their high weather resistance improving effects.

Said compounds having an intramolecular unsaturated group capable of polymerizing upon reaction with oxygen in the air may be used singly or two or more kinds of them may be used in combination.

Said photopolymerizable substances are, in other words, compounds having an unsaturated group capable of polymerizing as a result of activation of the double bond within the molecule upon light irradiation.

As typical examples of the photopolymerizable unsaturated group contained in said photopolymerizable substances, there may be mentioned vinyl, allyl, vinyl ether group, vinyl thioether group, vinylamino, acetylenically unsaturated groups, acryloyl, methacryloyl, styryl, cinnamoyl and like groups. Among these, acryloyl or methacryloyl are preferred because of their high photoinitiation efficiency.

As examples of said photopolymerizable substances containing an acryloyl or methacryloyl group as the photosensitive group, there may be mentioned acrylamide derivatives, methacrylamide derivatives, (meth)acrylates and the like. Among them, (meth)acrylates are preferred since various kinds of products are readily available. In the present specification, the term "(meth)acrylates" is used to collectively refer to acrylates and methacrylates.

As specific examples of said (meth)acrylate, there may be mentioned propylene (or butylene or ethylene) glycol di(meth)acrylate, which contains two functional groups, trimethylolpropane tri(meth)acrylate and pentaerythritol tri(meth)acrylate, which contain three functional groups, and pentaerythritol tetra(meth)acrylate and dipentaerythritol penta- or hexa(meth)acrylate, which contain four or more functional groups. As specific examples of the oligomer, there may be mentioned oligoesters having a molecular weight of not more than 10,000, such as polyethyleneglycol di(meth)acrylate and polypropyleneglycol di(meth)acrylate. The number of the acrylic or methacrylic type unsaturated groups is preferably not less than 2, more preferably not less than 3. The larger the number of functional groups is, the higher the weather resistant adhesion improving effect of said unsaturated acrylic compound is.

The photopolymerizable substances may be used singly or two or more kinds of them may be used in combination.

The addition amount of the weather-resistant property improving agent is preferably about 0.1 to 100 parts, more preferably 1 to 20 parts, per 100 parts of component (A). When the addition amount is below 0.1 part, the weather resistant adhesion improving effect may be insufficient in certain instances. At an addition amount exceeding 100 parts, the storage stability of the primer composition may be lowered in some instances.

In the primer composition of the present invention, use may be made of various fillers as necessary. As specific examples of said fillers, there may be mentioned woodmeal, pulp, cotton chips, asbestos, glass fiber, carbon fiber, mica, walnut shell flour, rice hull flour, graphite, diatomaceous earth, china clay, fumed silica, precipitated silica, silicic anhydride, carbon black, calcium carbonate, clay, talc, titanium oxide, magnesium carbonate, quartz, aluminum fine powder, flint powder and zinc dust. Among these fillers, precipitated silica, fumed silica, carbon black, calcium carbonate, titanium oxide, talc and the like are preferred. These fillers may be used singly or two or more kinds of them may be used combinedly. When a filler is used, it is used preferably in an amount of 1 to 500 parts, more preferably 50 to 200 parts, per 100 parts of component (A).

In addition to components (A) to (D) and the above-mentioned plasticizers, solvents, antioxidants, weather-resistant property improving agents and filler, various additives may be added to the primer composition of the present invention as necessary.

As examples of such additives, there may be mentioned physical property modifiers for modifying the tensile characteristics of the resulting cured coats, storage stability improvers, radical inhibitors, metal deactivators, antiozonants, antisagging agents, lubricants, pigments, antifoams and the like.

Specific examples of such additives are described, for example, in Japanese Kokoku Publications Hei-04-69659 and Hei-07-108928, Japanese Patent No. 2512468, and Japanese Kokai Publication Sho-64-22904.

The method of effecting adhesion of a sealing composition to a substrate of the present invention is carried out in the following manner.

At first, the primer composition of the present invention is applied to a substrate and the film formation of the primer composition is performed by standing in a condition according to said primer composition. And then a sealing composition is applied onto the primer layer and cured.

Usable as the sealing composition to be applied onto the primer layer in the present invention are sealing compositions of the modified silicone type, silicone type, polyurethane type, acrylic urethane type, polysulfide type, modified polysulfide type, butyl rubber type, acrylic type, SBR type or fluorine-containing type, for instance, oil-based caulking compounds, silicone-based mastics, and sealing compositions comprising, as the main component, a saturated hydrocarbon polymer having the reactive silicon group, and the like. When used for sealing compositions comprising a saturated hydrocarbon polymer having the reactive silicon group as the main component, among others, the primer composition of the present invention is very effective. In particular, when applied to sealing compositions containing, as the main component, an isobutylene polymer having a reactive silicon group (for example, the isobutylene-based sealing compositions disclosed in Japanese Kokoku Publication Hei-04-69659), said primer composition is preferred because of its good adhesion properties. Further, when using the isobutylene-based sealing compositions having the reactive silicon group, using the isobutylene polymer having a reactive silicon group as the component (A) of the primer is more preferable in consideration of compatibility between the sealing composition and the primer.

The primer composition of the present invention can provide firm adhesion between various metals such as iron, stainless steel, aluminum, nickel, zinc and copper, synthetic resin materials such as acrylic resins, phenol resins, epoxy resins, polycarbonate resins, polybutylene terephthalate resins and alkali-treated fluororesins, inorganic materials such as glass, ceramics, cement and mortar, or cured sealing compositions of the modified silicone type, silicone type, polyurethane type, acrylic urethane type, polysulfide type, modified polysulfide type, butyl rubber type, acrylic type, SBR type, fluorine-containing type or isobutylene type, on one hand, and various sealing compositions on the other.

The primer composition of the present invention can be applied to a substrate using coating techniques generally employed in the art, for example the brushing, spray coating, wirebar, blade, rollcoating, dippingandliketechniques. The primer composition of the present invention can form coat films generally at ordinary temperature. Coat film formation may be effected at various temperature conditions for adjusting the rate of coat formation.

EXAMPLES

The following examples and comparative examples illustrate the present invention in detail. They are, however, by no means limitative of the scope of the present invention.

Production Example 1

A 2-liter glass-made pressure vessel was fitted with a three-way cock and, after replacing the vessel inside atmosphere with nitrogen, charged with 138 ml of ethylcyclohexane (dried by allowing to stand at least overnight with molecular sieves 3A), 1,012 ml of toluene (dried by allowing to stand at least overnight with molecular sieves 3A), and 8.14 g (35.2 mmol) of p-DCC (the compound shown below), using a syringe.

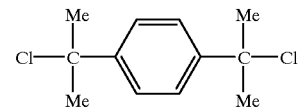

Then, a liquefied gas collector made of pressure-resistant glass and equipped with a needle valve and containing 254 ml (2.99 mol) of monomeric isobutylene was connected to the three-way cock, the polymerization vessel was immersed in a dry ice-ethanol bath at −70° C. and, after cooling, the vessel inside pressure was reduced using a vacuum pump. The needle valve was then opened and the monomeric isobutylene was introduced into the polymerization vessel from the liquefied gas collector. Thereafter, the vessel inside pressure was restored to ordinary pressure by introducing nitrogen from one way of the three-way cock. Then, 0.387 g (4.15 mmol) of 2-methylpyridine was added. Then, 4.90 ml (44. 7 mmol) of titanium tetrachloride was added to thereby initiate the polymerization. After allowing the reaction to proceed for 70 minutes, 9.65 g (13.4 mmol) of allyltrimethylsilane was added for effecting allyl group introduction into the polymer at the ends thereof. After 120 minutes of reaction, the reaction mixture was washed with four 200-ml portions of water and then the solvents were distilled off to give an allyl-terminated isobutylene polymer.

Then, 200 g of the thus-obtained allyl-terminated isobutylene polymer was mixed with 60 g of a paraffin-based process oil (a hydrocarbon-based plasticizer: product of Idemitsu Kosan; trademark "Diana Process PS-32"), the mixture was warmed to about 75° C. and, then, 1.5 [eq/vinyl group] of methyldimethoxysilane and 5×10⁻⁵ [eq/vinyl group] of platinum (vinylsiloxane) complex were added, and the hydrosilylation reaction was carried out. The reaction was monitored by FT-IR. The olefin-due absorption at 1640 cm⁻¹ disappeared in about 20 hours.

A mixture (10/3 by weight) of the desired isobutylene polymer with a reactive silicon group at each end (the compound shown below) and the plasticizer PS-32 was thus obtained.

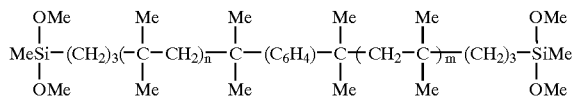

The yield of the polymer was calculated based on the amount obtained, the Mn and Mw/Mn were determined by the GPC technique, and the terminal structure was determined by measuring and comparing the intensities of the resonance signals of the protons assignable to the respective structures (initiator-derived protons: 6.5 to 7.5 ppm; the methyl protons bound to the polymer end-derived silicon atom: 0.0 to 0.1 ppm; and methoxy protons: 3.4 to 3.5) by 300 MHz 1H NMR analysis. 1H NMR spectra were measured in CDCl₃ using Varian Gemini 300 (300 MHz for 1H).

FT-IR was carried out using Shimadzu IR-408, and GPC was carried out using Waters LC Module 1 as the pumping system and Shodex K-804 as the column. The molecular weight is given in terms of relative molecular weight based on polystyrene standards. The analytical values of the polymer were as follows: Mn=5,780, Mw/Mn=1.28, Fn (silyl)=1.93. (The number average molecular weight is on the polystyrene equivalent basis, and the number of terminal functional silyl groups is the number per isobutylene polymer molecule.)

Production Example 2

An allyl-terminated isobutylene polymer was synthesized in the same manner as in Production Example 1 except that the addition amount were changed to the following: 262.5 ml of ethylcyclohexane, 787.5 ml of toluene, 438 ml (5.15 mol) of monomeric isobutylene, 4.85 g (21.0 mmol) of p-DCC, 0.72 g (7.7 mmol) of 2-methylpyridine, and 7.20 g (63.0 mmol) of allyltrimethylsilane.

Then, 400 g of the thus-obtained allyl-terminated isobutylene polymer was mixed with 200 g of a paraffin-based process oil, which is a hydrocarbon-based plasticizer; product of Idemitsu Kosan; trademark "Diana Process PS-32"), the mixture was warmed to about 75° C. and, then, 2.4 [eq/vinyl group] of methyldimethoxysilane and 7.5×10⁻⁵ [eq/vinyl group] of platinum (vinylsiloxane) complex were added, and the hydrosilylation reaction was carried out. The reaction was monitored by FT-IR. The olefin-due absorption at 1640 cm⁻¹ disappeared in about 20 hours.

A mixture (2/1 by weight) of the desired isobutylene polymer with a reactive silicon group at each end (the character of the compound is shown in the following) and the plasticizer PS-32 was thus obtained.

The analytical values of the polymer were as follows: Mn=17,600, Mw/Mn=1.23, Fn (silyl)=1.96.

Examples 1 to 3 and Comparative Example 1

The mixture of the saturated hydrocarbon polymer having the reactive silicon group (PIB) (component A) and the paraffin-based process oil (product of Idemitsu Kosan; trademark "Diana Process PS-32") (weight ratio: PIB/PS-32=10/3) as obtained in Production Example 1, the silane coupling agent N-phenyl-γ-aminopropyltrimethoxysilane (product of Shin-Etsu Chemical; trademark "KBM-573") (component B), the organic titanate ester tetra-n-butyl titanate (product of Wako Pure Chemical Industries) (component C), the silanol condensation catalyst dibutyltin bisacetylacetonate (product of Nitto Kasei; trademark "Neostan U-220") (component D) and the solvent n-hexane (product of Wako Pure Chemical) were mixed up in the weight rates given in Table 1 to give primer compositions.

Separately, the main component and curing agent of an isobutylene-based sealing composition were prepared in the following manner, and adhesive strength tests were performed using said sealing composition.

A hydrogenated α-olefin oligomer (60 parts; product of Idemitsu Petrochemical; trademark "PA05004"), 50 parts of precipitated calcium carbonate (product of Maruo Calcium; trademark "Seelets 200"), 50 parts of precipitated calcium carbonate (product of Maruo Calcium; trademark "MC-5"), 40 parts of ground calcium carbonate (product of Shiraishi Calcium; trademark "Softon 3200"), 5 parts of an epoxy resin (product of Yuka Shell Epoxy; trademark "Epikote 828"), 3 parts of a photocurable resin (product of Toagosei Chemical Industry; trademark "Aronix M-309"), 1 part of a hindered phenol antioxidant (product of Ciba-Geigy (Japan); trademark "Irganox 1010"), 1 part of a benzotriazole ultraviolet absorber (product of Ciba-Geigy (Japan); trademark "Tinuvin 327"), 1 part of a hindered amine light stabilizer (product of Sankyo; trademark "Sanol LS-770") and 5 parts of H₂O were weighed and admixed with 150 parts of the mixture of the saturated hydrocarbon polymer having the reactive silicon group (PIB) (component A) and the paraffin-based process oil (product of Idemitsu Kosan; trademark "Diana Process PS-32") (weight ratio: PIB/PS-32=2/1) as obtained in Production Example 2, followed by three kneading procedures on a small-sized three-roll paint mill. The resulting composition was used as the main component.

Separately, 3 parts of stannous octoate (product of Nitto Kasei; trademark "Neostan U-28"), 0.75 part of laurylamine (product of Wako Pure Chemical), 6.25 parts of a paraffin-based process oil (product of Idemitsu Kosan; trademark "Diana Process PS-32), 10 parts of ground calcium carbonate (product of Shlraishi Calcium; trademark "Softon 3200"), 10 parts of titanium oxide (product of Ishihara Sangyo; trademark "Tipaque R-820") and 0.2 part of carbon black (product of Mitsubishi Chemical: trademark "Carbon Black #30") were respectively weighed and mixed together, followed by kneading on a small-sized homogenizer. The resulting composition was used as the curing agent.

The tensile bond strength testing was performed in the following manner. Float glass sheets (product of Koensha; approved by the Japan Society of Sealing Material Manufacturers; size: 5×5×0.5 cm) or anodized aluminum sheets (product of Koensha; approved by the Japan Society of Sealing Material Manufacturers; size: 5×5×0.5 cm) as specified in JIS A-5758 were washed with methyl ethyl ketone (product of Wako Pure Chemical) and a primer specified in Table 1 was applied once thereto. Film formation was effected by allowing to stand at 23° C. for at least 1 hour. The above-mentioned main component and curing agent of the isobutylene-based sealing composition were weighed at a weight ratio of main component/curing agent=100/10 and thoroughly kneaded together and the resulting mixture was applied onto the primer layer to a thickness of 5 mm and cured in an oven. The curing conditions were always as follows: 23° C.×2 days +50×4 days. After curing, a manual peeling test was performed making a cut in the bond area with a cutter knife. The surface of each peeled substrate was observed, and the proportion of the portion showing cohesive failure was reported as cohesive failure rate (%). The primer formulations and the measurement results obtained in the adhesive property testing are summarized in Table 1.

TABLE 1

|  | Comparative Example 1 | Example 1 | Example 2 | Example 3 |
|---|---|---|---|---|
| Composition of primer (weight parts) | | | | |
| (A) mixture obtaind by Production Example 1 | 0 | 50 | 20 | 5 |
| (B) KBM-573 | 5 | 5 | 5 | 5 |
| (C) Ti(OBu)$_4$ | 5 | 5 | 5 | 5 |
| (D) U-220 | 5 | 5 | 5 | 5 |
| n-Hexane | 100 | 100 | 100 | 100 |
| Adhesive properties (Cohesive failure rate, %) | | | | |
| Float glass | 0 | 40 | 80 | 100 |
| Anodized aluminum sheet | 0 | 80 | 60 | 40 | in adhesion to float glass and anodized aluminum, with the cohesive failure rate being 0% in each case. On the contrary, the primer compositions of Examples 1 to 3 which contain the saturated hydrocarbon polymer having at least one reactive silicon group (component (A)) show relatively good adhesion properties, with cohesive failure rates not less than 40%.

As reported above, the primer compositions containing the (A) saturated hydrocarbon polymer having at least one reactive silicon group within the molecule show good adhesion properties for various substrates and, in particular, produce their effects when applied to isobutylene-based sealing compositions.

Production Example 3

An allyl-terminated isobutylene polymer was obtained in the same manner as in Production Example 1. The allyl-terminated isobutylene polymer obtained (120 g) was warmed to 90° C., 1.5 [eq/vinyl group] of methyldimethoxysilane and 5×10$^{-5}$ [eq/vinyl group] of platinum-(vinylsiloxane) complex were added, and the hydrosilylation reaction was carried out. The reaction was monitored by FT-IR. The olefin-due absorption at 1640 cm$^{-1}$ disappeared in 5 hours. The desired isobutylene polymer with a reactive silicon group at each end was thus obtained.

The polymer was analyzed in the same manner. The results were: Mn=5,800, Mw/Mn=1.35 and Fn (silyl)=1.90. (The number average molecular weight is a polystyrene equivalent, and the number of terminal silyl functions is the number per isobutylene polymer molecule.)

Example 4

The reactive silicon-containing saturated hydrocarbon polymer (component (A)) obtained in Production Example 3, the silane coupling agent N-phenyl-γ-aminopropyltrimethoxysilane (product of Shin-Etsu Chemical; trademark "KBM-573") (component (B)), the organic titanate ester tetra-n-butyl titanate (product of Wako Pure Chemical Industries) (component (C)), the silanol condensation catalyst dibutyltin bisacetylacetonate (product of Nitto Kasei; trademark "Neostan U-220") (component (D)) and the solvent n-hexane (product of Wako Pure Chemical) were mixed up in the weight proportions given in Table 2 to give a primer composition.

Example 5

A primer composition was prepared in the same manner as in Example 4 except that di-n-butyltin dimethoxide (product of Sankyo Yuki Gosei; trademark "SCAT-27") was used as component (D).

Example 6

A primer composition was prepared in the same manner as in Example 4 except that the reaction mixture from di-n-butyltin oxide and a dialkyl phthalate (product of Sankyo Yuki Gosei; trademark "No.918") was used as component (D).

(Method for Adhesion Property Evaluation in Example 4 to 6)

Float glass sheets (product of Koensha; approved by the Japan Society of Sealing Material Manufacturers; size; 5×5×0.5 cm) or anodized aluminum sheets (product of Koensha; approved by the Japan Society of Sealing Material Manufacturers: size: 5×5×0.5 cm) as specified in JIS A-5758 were washed with methyl ethyl ketone (product of Wako Pure Chemical) and the primers specified in Table 2 were applied once thereto. After 60 minutes of drying at room temperature, the sheets were assembled into an H-shaped body according to JIS A-1439. The above-mentioned main component and curing agent of the isobutylene-based sealing composition were weighed at a weight ratio of main component/curing agent=100/10 and thoroughly kneaded together and the resulting mixture was filled into said body. After curing at 23° C.×3 days+50° C.×4 days, the thus-prepared test piece was subjected to tensile testing. Separately, a thoroughly cured silicone-based sealing composition (product of Yokohama Rubber, trademark "Silicone 70"; product of Toshiba Silicone, trademark "Tosseal 361"; or product of Toray Dow Corning, trademark "SE-792") having a size of 4×3×1 cm was divided into two (size: 4×3×0.5 cm) with a cutter knife. Each cut surface was washed with toluene (product of Wako Pure Chemical) and a primer specified in Table 2 was applied once thereto. After allowing to stand at 23° C. for at least 1 hour for coat film formation, the above-mentioned isobutylene-based sealing composition prepared by weighing and thoroughly kneading the main component and curing agent thereof together at a weight ratio of main component/curing agent=100/10 was applied onto the primer layer to a thickness of 5 mm and cured in an oven. The curing conditions were always as follows: 23° C.×3 days+50° C.×4 days. After curing, a manual peeling test was performed making a cut in the bond area with a cutter knife. The surface of each peeled substrate was observed, and the proportion of the part showing cohesive failure was reported as cohesive failure rate(%). The measurement results of the adhesion property testing relative to the float glass and anodized aluminum sheets and the measurement results obtained in the adhesion property testing by placing the silicone-based sealing composition in contact with the already cured one are summarized in Table 2, together with the primer formulations.

TABLE 2

|  | Example 4 | Example 5 | Example 6 |
|---|---|---|---|
| Composition of primer (weight parts) | | | |
| (A) mixture obtaind by Production Example 3 | 20 | 20 | 20 |
| (B) KBM-573 | 5 | 5 | 5 |
| (C) Ti(OBu)$_4$ | 5 | 5 | 5 |
| (D) U-220 | 5 | | |
| (D) SCAT-27 | | 5 | |
| (D) No.918 | | | 5 |
| n-Hexane | 100 | 100 | 100 |
| Float glass M50 Kg/cm$^2$ | 0.84 | 0.90 | 0.88 |
| Tmax Kg/cm$^2$ | 2.13 | 2.59 | 3.11 |
| Emax % | 266 | 355/259 | 440/389 |
| failure state | CF80/AF20 | CF | CF |
| Anodized aluminum sheet M50 Kg/cm$^2$ | 0.82 | 0.88 | 0.88 |
| Tmax Kg/cm$^2$ | 2.13 | 2.83 | 3.55 |
| Emax % | 274 | 372 | 464 |
| failure state | CF90/AF10 | CF | CF |
| Yokohama rabber Silicone 70 | 100 | 100 | 100 |
| Toshiba Silicone Tosseal 361 | 100 | 100 | 100 |
| Toray DC SE-792 | 100 | 100 | 100 |

AF (adhesion failure): a state in which a substrate and a cured compound are separated.
CF (cohesion failure): a state of a cured compound itself in failure is applied to isobutylene-based sealing compositions.

What is claimed is:

1. A primer composition used for effecting adhesion for a sealing composition to a substrate which comprises a solvent and, as component (A), a saturated hydrocarbon polymer having at least one silicon-containing group which has a hydroxyl group or hydrolysable group bound to the silicon atom and is capable of crosslinking under formation of a siloxane bond and, as component (B), a silane coupling agent, wherein said solvent is used in an amount of 100 to 10,000 weight parts per 100 weight parts of said saturated hydrocarbon polymer, and said polymer contains isobutylene-derived repeating units in a total amount of not less than 50 weight %, and wherein said silicon-containing group is represented by the general formula (1)

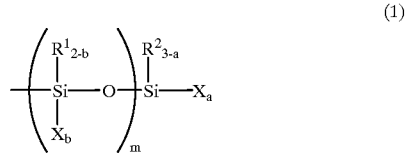

(1)

wherein R$^1$ and R$^2$ each is independently an alkyl group containing 1 to 20 carbon atoms, an aryl group containing 6 to 20 carbon atoms, an aralkyl group containing 7 to 20 carbon atoms or a triorganosiloxy group of the formula (R')$_3$SiO—, wherein each R' independently represents a substituted or unsubstituted hydrocarbon group containing 1 a to 20 percent carbon atoms, each X independently represents a hydroxyl group or a hydrolyzable group, a is 0, 1, 2 or 3, b is 0, 1 or 2 to the exclusion of the case where a and b are simultaneously 0 (zero), and m is 0 (zero) or an integer of 1 to 19.

2. The primer composition according to claim 1 which further comprises an organic titanate ester as component (C).

3. The primer composition according to claim 1 which further comprises a silanol condensation catalyst as component (D).

4. The primer composition according to claim 1, wherein component (A), namely the saturated hydrocarbon polymer having at least on silicon-containing group, has a number average molecular weight in the range of 500 to 50,000 and each molecule thereof contains one or more hydrolyzable silyl groups at the end of main chain and/or at the end of side chain.

5. The primer composition according to claim 1, wherein component (B), namely the silane coupling agent comprises an isocyanato-containing silane coupling agent and/or an amino-containing silane coupling agent.

6. The primer composition according to claim 1 wherein 0.1 or 10,000 parts by weight of the (B) silane coupling agent is contained per 100 parts by weight of the (A) saturated hydrocarbon polymer having at least one silicone-containing group.

7. The primer composition according to claim 2 which further comprises a silanol condensation catalyst as component (D).

8. The primer composition according to claim 1, wherein said sealing composition contains, as a main component thereof, a saturated hydrocarbon polymer having at least one silicon-containing group which has a hydroxyl group or hydrolyzable group bound to the silicon atom and its capable of crosslinking under formation of a siloxane bond.

9. The primer composition according to claim 8, wherein said saturated hydrocarbon polymer in said sealing composition contains isobutylene-derived repeating units in a total amount of not less than 50% by weight.

10. A method of effecting adhesion for a sealing composition to a substrate, which comprises applying, to the substrate, a primer composition containing, as component (A), a saturated hydrocarbon polymer having at least one silicon-containing group which has a hydroxyl group or hydrolyzable group bound to the silicone atom and is capable of crosslinking under formation of a siloxane bond, and then causing adhesion, to said primer-applied surface, of a sealing composition, wherein said polymer contains isobutylene-derived repeating units in a total amount of not less then 50% by weight.

11. The method according to claim 10, wherein said sealing composition contains, as a main component therof, a saturated hydrocarbon polymer having at least on silicon-containing group which has hydroxyl group or hydrolyzable bound to the silicon atom and is capable of crosslinking under formation of a siloxane bond.

12. The method according to claim 11, wherein said saturated hydrocarbon polymer in said sealing composition contains isobutylene-derived repeating units in a total amount of not less than 50% by weight.

13. The method according to claim 10, wherein said primer composition further comprises a silane coupling agent as component (B).

14. The method according to claim 10, wherein said primer composition further comprises an organic titanate ester as component (C).

15. The method according to claim 10, wherein said primer composition further comprises a silanol condensation catalyst as component (D).

16. The method according to claim 10, wherein component (A), namely the saturated hydrocarbon polymer having at least one silicon- containing group, has a number average molecular weight in the range of 500 to 50,000 and each molecule thereof contains one or more hydrolyzable silyl groups at the end of main chain and/or at the end of side of chain represented by the general formula (1)

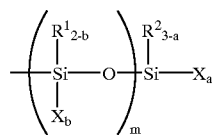
(1)

wherein R¹ and R² each is independently an alkyl group containing 1 to 20 carbon atoms, an aryl group containing 6 to 20 carbon atoms, an aralkyl group containing 7 to 20 carbon atoms or a triorganosiloxy group of the formula (R')₃SiO—, in which each R' independently represents a substituted or substituted hydrocarbon group containing 1 to 20 carbon atoms, each X independently represents hydroxyl group or a hydrolyzable group, a is 0, 2, 2 or 3, b is 0, 1 or 2, to the excusion of the case where and b are simultaneously 0 (zero), and m is 0 (zero) or an integer of 1 or 19.

17. The method according to claim 13, wherein component (B), namely the silane coupling agent comprises an isocyanato-containing silane coupling agent and/or an amino-containing silane coupling agent.

18. The method according to claim 10, wherein said primer composition further comprises a solvent in an amount of 100 to 10,000 weight parts per 100 weight parts of said saturated hydrocarbon polymer (A).

19. the method according to claim 10, wherein the adhesion of the sealing composition provides a sealing layer having a thickness of 5 mm to 12 mm.

20. A laminate comprising:
(X) a substrate,
(Y) a primer layer obtained from a primer composition which comprises, as component (A), a saturated hydrocarbon polymer having at least one silicon-containing group which has a hydroxyl group or hydrolyzable group bound to the silicon atom and is capable of crosslinking under formation of a silixane bond, and
(Z) a sealing layer having a thickness of 5 mm to 12 mm, wherein said substrate (X) is adhered to said sealing layer (Z) via said primer layer (Y) and said polymer contains isobutylene-derived repeating units in a total amount of not less then 50% by weight.

21. The laminate according to claim 20, wherein said sealing layer is obtained from a composition contains, as a main component thereof, a saturated hydrocarbon polymer having at least one silicon-containing group which has hydroxyl group or hydrolyzable group bound to the silicon atom and is capable of crosslinking under formation of a siloxane bond.

22. The laminate according to claim 20, wherein said saturated hydrocarbon polymer in said sealing layer contains isobutylene-derived repeating units in a total amount of not less then 50% by weight.

23. The laminate according to claim 20 wherein said primer composition further comprises a silane coupling agent as component (B).

24. The laminate according to claim 23, wherein component (B), namely the silane coupling agent comprises an isocyanato-containing silane coupling agent and/or and amino-containing silane coupling agent.

25. The laminate according to claim 20, wherein said primer composition further comprises an organic titanate ester as component (C).

26. The laminate according to claim 20, wherein said primer composition further comprises a silanol condensation catalyst as component (D).

27. The laminate according to claim 20, wherein component (A), namely the saturated hydrocarbon polymer having at least one silicon-containing group, has a number average molecular weight in the range of 500 to 50,000 and each molecule thereof contains one or more hydrolyzable silyl groups at the end of main chain and/or at the end of side chain represented by the general formula (1)

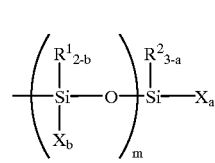
(1)

wherein R¹ and R² each is independently an alkyl group containing 1 to 20 carbon atoms, an aryl group containing 6 to 20 carbon atoms, an aralkyl group containing 7 to 20 carbon atoms or a triorganosiloxy group of the formula (R')₃SiO—, (in which each R' independently represents a substituted or substituted hydrocarbon group containing 1 to 20 carbon atoms), each X independently represents a hydroxyl group or a hydrolyzable group, a is 0, 2, 2 or 3, b is 0, 1 or 2, to the exclusion of the case where and b are simultaneously 0 (zero), and m is 0 (zero) or an integer of 1 to 19.

28. The laminate according to claim 20, wherein said primer composition further comprises a solvent in an amount of 100 to 10,000 weight parts per 100 weight parts of said saturated hydrocarbon polymer (A).

* * * * *

UNITED STATES PATENT AND TRADEMARK OFFICE
CERTIFICATE OF CORRECTION

PATENT NO. : 6,451,439 B2
DATED : September 17, 2002
INVENTOR(S) : Toshiko Okamoto et al.

It is certified that error appears in the above-identified patent and that said Letters Patent is hereby corrected as shown below:

Column 21,
Line 56, delete the word "a" (first occurrence).

Column 22,
Line 13, replace the word "silicone" with the word -- "silicon" --.
Line 44, replace the word "on" with the word -- "one" --.
Line 45, insert the word -- "group" -- after the word "hydrolyzable."

Column 23,
Lines 13-14, replace the term "a substitute or substituted" with -- "a substituted or unsubstituted" --.
Line 28, replace the word "the" with the word -- "The" -- (first occurance).

Column 24,
Line 43, replace "where and b" with -- "where a and b" --.

Signed and Sealed this

Nineteenth Day of August, 2003

JAMES E. ROGAN
*Director of the United States Patent and Trademark Office*